United States Patent [19]

Ujiie et al.

[11] Patent Number: 4,973,348
[45] Date of Patent: Nov. 27, 1990

[54] CARRIAGE TO CARRY MOLD FOR BENDING GLASS SHEETS

[75] Inventors: Kenji Ujiie, Matsusaka; Masami Nishitani, Mie, both of Japan

[73] Assignee: Central Glass Company, Limited, Ube, Japan

[21] Appl. No.: 424,120

[22] Filed: Oct. 19, 1989

[30] Foreign Application Priority Data

Oct. 21, 1988 [JP] Japan .................. 63-137611[U]

[51] Int. Cl.$^5$ ............................................. C03B 23/02
[52] U.S. Cl. ...................................... 65/288; 65/361; 65/DIG. 4
[58] Field of Search .......... 65/104, 106, 115, 287–291, 65/351, 361, DIG. 4

[56] References Cited

U.S. PATENT DOCUMENTS

| 4,043,785 | 8/1977 | Reese | 65/290 X |
| 4,072,493 | 2/1978 | Imler | 65/288 X |
| 4,173,461 | 11/1979 | Ebata et al. | 65/106 |
| 4,233,050 | 11/1980 | Comperatore et al. | 65/104 X |

Primary Examiner—Robert L. Lindsay
Attorney, Agent, or Firm—Fleit, Jacobson, Cohn, Price, Holman & Stern

[57] ABSTRACT

This invention relates to a mold carriage for carrying thereon a mold for bending a glass sheet, or a stack of glass sheets to be laminated, placed thereon into a curved shape by heating in a furnace. To locally intensely heat the glass sheet in a selected area to be bent sharply relative to the major area, the mold carriage is installed with a heater to heat a selected area of the glass sheet from underneath, a holder to hold the heater and adjust the position of the heater, and a heater support to support thereon an external heater which is suspended from a separate member disposed in the furnace to heat the afore-mentioned area of the glass sheet from above. The heater support also can adjust the position of the external heater.

6 Claims, 1 Drawing Sheet

CARRIAGE TO CARRY MOLD FOR BENDING GLASS SHEETS

BACKGROUND OF THE INVENTION

This invention relates to the bending of a glass sheet or a stack of glass sheets by heating the glass sheet(s) placed on a bending mold to cause sagging of the softened glass sheet(s), and more particularly to a carriage for supporting thereon the bending mold and carrying the mold with the glass sheet(s) placed thereon into a shaping zone of a furnace, the carriage having means to locally intensely heating the glass sheet(s).

For producing a curved glass sheet member such as an automobile window glass, one of the conventional methods of bending a glass sheet to a desirerably curved shape is the sag bending method. By this method the glass sheet is horizontally placed on a bending mold, usually a female mold, and heated to a temperature near to the softening point of the glass so that the softened glass sheet sags and bends in conformance with the shaping surface of the mold. Usually the bending mold is mounted on a carriage, which travels along a predetermined path through a furnace to allow the glass sheet lying thereon to be sufficiently heated before entering the shaping zone of the furnace. In the case of producing a curved and laminated glass member, the two glass sheets to be laminated are placed on the bending mold as a stack with application of a releasing agent at the interface between the two glass sheets, and the two glass sheets are bent simulataneously in the above manner.

When it is required to relatively sharply bend the glass sheet in its selected and limited areas than in the major region it is usual to locally intensely heat the glass sheet in its selected regions by using auxiliary heaters provided to the furnace. In this regard it is known to fixedly attach heaters to the mold carriage at such locations that selected areas of the glass sheet lying on the mold may be intensely heated from the downside. However, it is difficult to attach heaters to the mold carriage so as to locally heat the glass sheet on the mold from the upside.

JP-A 59-162142 proposes to locally intensely heat a glass sheet to be bent by providing the shaping furnace with a swingably suspended arm which holds a heater element to heat a specified area of the glass sheet from the upside. JP-A 62-41728 proposes to locally intensely heat a glass sheet travelling through a furnace from the upside by moving suspended heating means such as gas burners along the path of the travel of the glass sheet. However, these proposals entail complicated mechanisms and troublesome operations.

SUMMARY OF THE INVENTION

Concerning the bending of a glass sheet by the sag bending method, it is an object of the present invention to provide a mold carriage provided with simple means to intensely heat specified areas of the glass sheet lying on the mold both from the upside and from the downside.

According to the invention there is provided a mold carriage for supporting thereon a mold to bend a glass sheet placed thereon into a predetermined curved shape by heating in a furnace, the mold carriage comprising a frame for supporting thereon a mold, a lower heater element for locally heating a selected area of a glass sheet lying on the mold mounted on the frame from the downside, a heater holder which is attached to the frame and holds the lower heater element at a location below the mold and beneath the selected area of the glass sheet, the heater holder comprising means for adjusting the position of the lower heater element, and a heater support which is attached to and projects upward from the frame to support thereon an upper heaters element for locally heating the selected area of the glass sheet from the upside, the heater support comprising means for adjusting the position of the upper heater element.

In this invention the upper heater element does not need to be a part of the mold carriage. Rather, it is suitable to suspend the upper heater element from a hanger which is upwardly and downwardly movable disposed in a shaping zone or a heating zone of the furnace. To stably support the upper heater element provided in such a manner, it is suitable to use a heater terminal holder having a V-shaped lower section and form a V-shaped groove in the upper surface of the heater support on the mold carriage.

Needless to mention, depending on the shape and size of the upper and lower heater elements, a mold carriage according to the invention may have another holder for the lower heater element and another support for the upper heater element with a position adjusting means for each holder and support, and the carriage may have a plurality of sets of lower heaters and upper heater supports for locally heating a plurality of areas of the glass sheet.

Using a mold carriage according to the invention it is practicable to locally intensely heat the glass sheet in its selected regions both from the upside and from the downside by a simple mechanism, and the local and intense heating can be accomplished very accurately since the position of each heater element is adjustable.

A mold carriage according to the invention can also be used for simultaneously bending two glass sheets to be laminated. In such a case the local heating from the both sides of the glass sheets is very favorable for bending the two glass sheets in accurate conformance to each other in curvature. Of course the bending is accomplished in a relatively short time even when bending the glass sheets to an intricately curved shape.

DESCRIPTION OF THE PREFERRED EMBODIMENT

Figure 1:
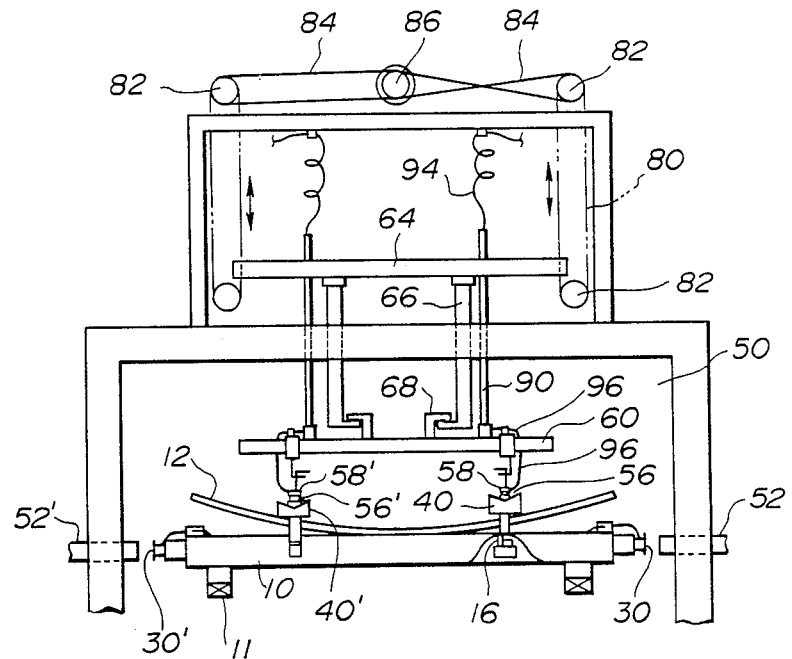
FIG. 1 is a front view of a mold carriage as an embodiment of the invention, the carriage being in operation position in a furnace for bending a glass sheet.
Figure 2:
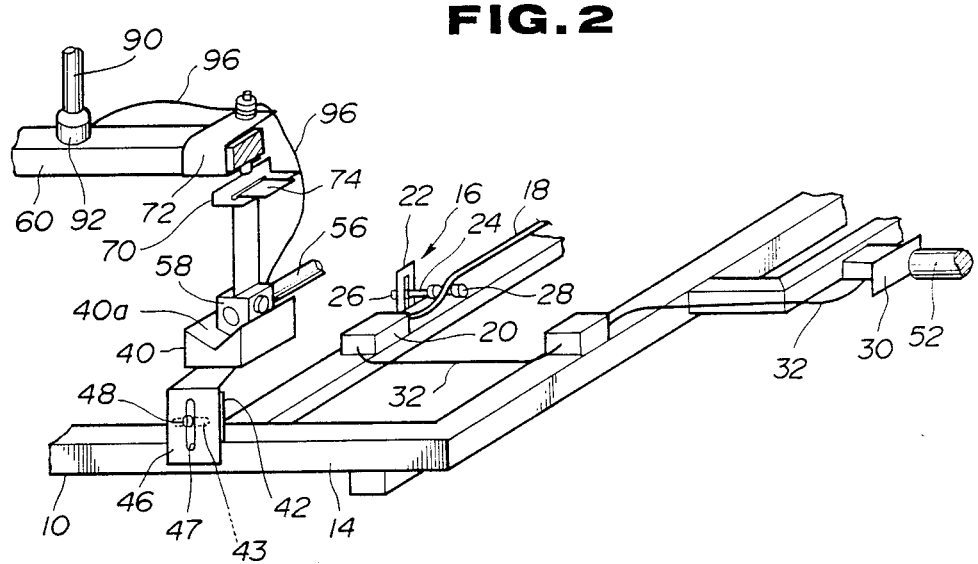
FIG. 2 is a perspective view of a part of the mold carriage, showing a heater installed on the carriage and another heater which is provided to the furnace and resting on a support attached to the carriage.

A preferred embodiment of the present invention is shown in FIGS. 1 and 2. A mold carriage 10 according to the invention carries thereon a bending mold 12 on which a glass sheet (not shown), or a stack of two sheets of glass to constitute laminated glass, is placed horizontally. In a furnace 50 the mold carriage 10 can be transferred along a predetermined path by means of, for example, a chain conveyor 11. The body of the carriage 10 is a frame 14. The furnace 50 is provided with heaters (not shown) for entirely and uniformly heating the glass sheet placed on the mold 12 to a temperature sufficient to bend the glass sheet.

A heater holder 16 is attached to the frame 14 of the mold carriage 10 at a location below the mold 12 to hold a heater element 18 such as a metal ribbon heater. This heater element 18 is for locally intensely heating the glass sheet in a predetermined area from the downside. The holder 16 includes a ceramic terminal 20 attached to the carriage frame 14, a plate 22 which is attached to the frame 14 and has a vertically elongate slot-like aperture, a male screw 24 horizontally inserted in the aperture of the plate 22, nuts 26 for fixing the male screw 24 to the plate 22 and a ceramic bobbin-like guide roll 26 which is fixed to a tip of the male screw 24. An end of the ribbon heater 18 is connected to the terminal 20. The position of the guide roll 28 is adjusted by moving the male screw 24 inserted in the elongate aperture of the plate 22 upward or downward and/or axially and then fixing the male screw 24 to the plate 22 with nuts 26. The other end of the ribbon heater 18 is held in the same manner.

A terminal plate 30 is fixed, with insulation, to a side member of the carriage frame 14, and a lead wire 32 for the ribbon heater 18 extends from this terminal plate 30 to the terminal 20. To connect the terminal plate 30 to a power supply (not shown) a conductor rod 52 penetrates into the furnace 50 through its side wall, with insulation. The conductor rod 52 can be moved axially to bring its tip into tight contact with the terminal plate 30.

A heater support 40 is attached to the carriage frame 14 to support thereon a heater element 56 which is provided in the furnace 50 to intensely heat the aforementioned predetermined area of the glass sheet on the mold 12 from the upside. In this embodiment the heater element 56 is a rod-shaped ceramic heater disposed horizontally to extend above and parallel to the above described ribbon heater 18. A plate 42 having a horizontally elongate slot-like aperture 43 is fixed to the carriage frame 14, and an inverted L-shaped bracket 46 having a vertically elongate slot-like aperture 47 is attached to the plate 42 by inserting a bolt 48 through the apertures 47 and 43 at the intersection of the crossing apertures 47, 43 and fixing the bolt 48 by nuts (not shown). The heater holder 40 is horizontally swivellably mounted on the horizontal arm part of the bracket 46. The position of the holder 40 is adjusable by varying the position of the bracket 46 relative to the fixed plate 42 before fixing the bolt 48. A terminal of the rod-shaped heater 56 is held by a holder 58. A lowermost part of the holder 58 is V-shaped in vertical sections, and the upper surface of the heater support 40 is formed with a cross-sectionally V-shaped groove 40a conforming to the V-shaped part of the holder 58. Therefore, the holder 58 stably rests on the support 40 even though there is some disagreement of lateral positions of the holder 58 and the support 40. The opposite terminal of the rod-shaped heater 56 is held by a similar holder (58), and that holder rests on another support (40) attached to the carriage 10.

As shown in FIG. 1, according to need the furnace 50 is provided with another rod-shaped heater 56' to locally intensely heat the glass sheet in a predetermined second area from the upside. As indicated at 40' and 58' each terminal of the heater 56' is held and supported in the manner illustrated in FIG. 2. Beneath the rod-shaped heater 56' another heater (not shown) corresponding to the heater 18 in FIG. 2 may be installed on the carriage frame 14 to intensely heat the second area of the glass sheet from the downside. Numerals 30' and 52' indicate another terminal plate and another power feeding conductor rod for the heater to heat the glass sheet from the downside.

The rod-shaped heaters 56, 56' are suspended from a hanger frame 60, which is a bottom part of a cage-like framework 64 suspended from an upper structure of the furnace 50 by belts 80 stretched vertically. The framework 64 is disposed in that zone of the furnace 50 where the predetermined areas of the glass sheet on the mold are to be intensely heated. The framework 64 can be moved downward and upward by operating a motor 86 to run belts 84 to thereby turn 82 around which the belts 80 are stretched. For example, the framework 64 includes vertical members 66 each angled at the lower end, and the hanger frame 60 is suspended from these vertical members 66 by angled brackets 68 fixed to the frame 60 and hooked to the angled ends of the vertical members 66. The extent of the ascent and descent of the framework 64 is set by limit switches (not shown).

For each terminal holder 58 to hold the rod-shaped heater 56, a bracket 70 having a L-shaped lower part is fixed to an insulator band 72 attached to the hanger frame 60. The horizontal tongue of the L-shaped part of the bracket 70 has a slot, and an angled strip 74 is inserted into the slot to extend downward. The terminal holder 58 is fixed to the lower end part of the strip 74. Instead of the combination of the L-shaped bracket 70 and the angled strip 72 it is possible to use a flexible and heat-resistant string or the like. For each terminal holder 58 a conductor rod 90 is attached to the framework 64 to extend vertically, and at the lower end the conductor rod 90 is fixed to ceramic insulators 92 attached to the hanger frame 60. At the upper end the conductor rod 90 is connected with a power supply (not shown) by a lead wire 94. At the lower end the conductor rod 90 is connected with the terminal of the rod-shaped heater 56 by a lead wire 96.

In preparation for a glass sheet bending operation, the mold 12 is mounted on the carriage 10 outside the furnance 50, and the glass sheet (or a stack of two glass sheets to be lamiated after bending) is horizontally placed on the mold 12. The positions of the supports 40 for the heaters 56, 56' in the furnace are adjusted in conformance with the areas of the glass sheet to be intensely heated, and the position of each holder 16 for the lower heater 18 is adjusted similarly, and the lower heater 18 is installed on the carriage 10. After that the carriage 10 is introduced into the furnace and moved on the conveyor 11 to gradually heat the glass sheet. When the carriage 10 arrives at the zone where the framework 64 is disposed, the framework 64 is lowered until the heater terminal holders 58 rest on the supports 40 on the carriage 10, respectively. Then the upper heaters 56 are energized, and at the same time the lower heaters 18 are energized by thrusting the power feeding rods 52 against the respective terminal plates 30. By the heaters provided on the side walls of the furnace 50 the glass sheet is entirely heated up to a shaping temperature such as about 630° C., and by the additional and local heating by the upper and lower heaters 56 and 18 the predetermined areas of the glass sheet are heated to a temperature higher than the aforementioned shaping temperature by tens of degrees centigrade but lower than the softening point of the glass. Consequently the glass sheet bends in accurate conformance with the curved shape of the mold 12, and the bending is completed in a short time. In the case of bending a stack of two glass sheets, the bending is accomplished without producing any difference in curvature between the two glass sheets.

What is claimed is:

1. A mold carriage for supporting thereon a mold to bend a glass sheet placed thereon into a predetermined curved shape by heating in a furnace, the mold carriage comprising:

a frame on which the mold is mounted;

a lower heater element for locally heating a selected area of the glass sheet lying on the mold mounted on said frame from the downside;

a heater holder which is attached to said frame and holds said lower heater element at a location below the mold and beneath the selected area of the glass sheet, the heater holder comprising adjustment means for adjusting the position of said lower heater element; and a heater support which is attached to and projects upward from said frame to support thereon an upper heater element for locally heating said selected area of the glass sheet from the upside, the heater support comprising adjustment means for adjusting the postion of said upper heater element;

said adjustment means of said heater support comprising a first member which is attached to said frame and is formed with a vertically or horizontally elongate aperture, a second member which is arranged adjacent to said first member and formed with an elongate aperture at normal angles with said elongate aperture of said first member, an elongate third member which is inserted in said aperture of said first member and said aperture of said second member, means for detachably fixing said third member to said first and second members and a fourth member which is horizontally swivellably attached to said second member and supports thereon said upper heater element.

2. A mold carriage according to claim 1, wherein said adjustment means of said heater holder comprises a first member which is attached to said frame and is formed with an elongate aperture, an elongate second member which is inserted in said aperture, a guide member which is attached to an end of said second member and makes contact with said lower heater element and fastening means for detachably fixing said second member to said first member.

3. A mold carriage according to claim 2, wherein said lower heater element is a ribbon heater element, said guide member having a bobbin-like shape.

4. A mold carriage according to claim 1, wherein said heater support has an upper surface formed with a groove such that a terminal holder attached to a terminal of said upper heater element engages with said groove.

5. A mold carriage according to claim 4, wherein said groove is cross-sectionally V-shaped.

6. A mold carriage according to claim 4, wherein said upper heater element is a rod-like heater element suspended from a separate member disposed in the furnace.

* * * * *